United States Patent [19]
Wardell

[11] Patent Number: 4,882,070
[45] Date of Patent: * Nov. 21, 1989

[54] WASTE WATER CLARIFICATION

[75] Inventor: Harry H. Wardell, New Port Richey, Fla.

[73] Assignee: Dellchem, Inc., New Port Richey, Fla.

[*] Notice: The portion of the term of this patent subsequent to Aug. 2, 2005 has been disclaimed.

[21] Appl. No.: 171,658

[22] Filed: Mar. 22, 1988

Related U.S. Application Data

[63] Continuation of Ser. No. 399,951, Aug. 25, 1986, Pat. No. 4,761,239, which is a continuation-in-part of Ser. No. 850,238, Apr. 10, 1986, abandoned.

[51] Int. Cl.$^4$ ................................................ C02F 1/56
[52] U.S. Cl. ...................................... 210/727; 210/736
[58] Field of Search ................ 210/631, 714, 725–728, 210/734, 735

[56] References Cited

U.S. PATENT DOCUMENTS

| | | | |
|---|---|---|---|
| 828,938 | 8/1906 | Kniffler | 210/727 |
| 3,226,319 | 12/1965 | Schick | 210/727 |
| 3,259,570 | 7/1966 | Priesing et al. | 210/727 |
| 3,372,149 | 3/1968 | Fertig et al. | 210/734 |
| 3,377,274 | 4/1968 | Burke et al. | 210/727 |
| 3,388,060 | 6/1968 | Clark | 210/728 |
| 3,397,139 | 8/1968 | Sak | 210/631 |
| 3,408,293 | 10/1968 | Dajani et al. | 210/727 |
| 3,652,479 | 3/1972 | Mogelnicki et al. | 210/735 |
| 3,738,945 | 6/1973 | Panzer et al. | 210/736 |
| 4,046,684 | 9/1977 | Tsunoda et al. | 210/715 |
| 4,178,434 | 12/1979 | Langdon | 528/405 |
| 4,179,329 | 12/1979 | Suarz | 210/727 |
| 4,217,214 | 8/1980 | Dubin | 210/735 |
| 4,411,797 | 10/1983 | Sander et al. | 210/727 |
| 4,417,976 | 11/1983 | Sander et al. | 210/727 |
| 4,498,993 | 2/1985 | Raba et al. | 210/728 |
| 4,761,239 | 8/1988 | Wardell | 210/727 |

Primary Examiner—Peter Hruskoci
Attorney, Agent, or Firm—Doninik, Stein, Saccocio, Reese, Colitz & Van Der Wall

[57] ABSTRACT

A process for increasing the efficiency of a primary clarifier in raw waste water clarification by reducing biological oxygen demand and suspended solids by the sequential addition upstream of the primary clarifier of: (1) a salt of a water soluble bi- or tri-valent metal and compositions or mixtures thereof, (2) fly-ash, and (3) a cationic surface active polymer composition comprising a branched, high cationic charge density containing and water soluble polymeric polyether amine solution at the primary clarifier and recovering the clarified effluent from the primary clarifier.

11 Claims, 1 Drawing Sheet

WASTE WATER CLARIFICATION

RELATED APPLICATION

This application is a continuation of Ser. No. 899,951, filed Aug. 25, 1986, now Pat. No. 4,761,239 which is incorporated herein by reference in its entirety, which is a continuation-in-part of application Ser. No. 850,238 filed April 10, 1986 now abandoned which is incorporated herein by reference in its entirety.

BACKGROUND OF THE INVENTION

1. Field of Invention

This invention relates to the sequential addition to the influent raw waste water upstream of the primary clarifier or sedimentation tank; first, a salt of a water soluble bi- or tri-valent metal, or mixtures thereof; second, fly-ash and third, a water soluble cationic surface active polymer composition comprising a polyether amine to improve the efficiency of the primary clarifier in raw waste water clarification.

2. Information Disclosure Statement

Numerous attempts have been made by the prior art to lower biological oxygen demand and chemical oxygen demand, to reduce terbidity, to decrease residence time in the primary clarifier, to remove colloidal material and to reduce the volume of sludge in waste water treatment while maintaining the efficacy of the treatment process.

One prior art process utilizes high molecular weight polyvinyl amine hydrochloride alone or in combination with alum or ferric chloride to serve as a flocculating agent.

Another prior art process teaches consolidating a low solids content liquid sludge via adding weighting agents such as coal ash, limestone powder or cement to the sludge before, during or after the addition of agglomerants.

A further process teaches a method for improving the de-watering of aqueous suspensions of organic solids by adding a high molecular weight, water soluble, anionic polymer prior to the addition of the cationic polyelectrolyte to aqueous suspensions, including municipal waste sludges, for example, raw activated (obtained by aerobic biological oxidation of raw sewage) and digested (obtained by anaerobic biological oxidation of raw sewage) sewage sludges. A preferred species of anionic polyelectrolyte is a high molecular weight homopolymer of an alkali metal salt of vinyl-benzene sulfonic acid. Cationic polyelectrolytes used in the above invention are water-soluble, synthetic, organic polymers characterized as containing in or attached along the polymeric chain a plurality of amino, imino or quaternary ammonium groups.

Another prior art process teaches an improved process for the clarification of coal wash water by the sequential addition of a critical amount of both anionic polymer followed by a cationic polymer to the aqueous suspension.

Another prior art method teaches a process for dewatering of petroleum containing sludges with recovery of the oil by adding finely divided additives (ash, coal, sand) and homogeneously disperse in petro-containing sludge then adding to the mixture an organic flocculent and allow for gravity filtration which removes a greater part of the sludge water. The dewatered sludge mixture is then treated with aluminum or iron salts and the mixture is substantially de-watered by pressure filtration.

Another prior art process teaches the removal of color from papermill waste waters, by adding polyethylene imine with a molecular weight of at least 300 in an amount sufficient to form a complex solid of the imine with the color bodies in the waste water which is flexible.

A further prior art process teaches the de-watering of sludge without adding lime, ash or sand by adding an organic flocculent to the sewage sludge, mixing, holding for about 5 minutes to insure the formation of flocculated sewage sludge particles and allowing flocculated sewage sludge to filter by way of gravity and passing gravity filtered flocculated sewage sludge particles to a chamber filter process without using shear forces (reciprocating diaphram pumps or electric screw pumps are used) then pressure filtering the gravity filtered flocculated sewage sludge at a pressure of 10–15 bar using a chamber filter press.

An early prior art process teaches a method of removing impurities from water by adding an emulsion of a saponified resin to the impure water, then adding an acid acting chemical, such as alum, which causes the emulsion to coagulant and any impurities adhere to the coagulate which separates from the water.

Another prior art method teaches a process to decolorize pulp mill bleach plant caustic extraction effluent by utilizing a primary or other sludge from a pulp papermill. The sludge is acidified and mixed with the effluent, allowed to stand and then raised to at least a neutral pH which causes the precipitation of most of the color in the effluent which may be removed by conventional clarification techniques.

Another prior art method is drawn to a method for automatically changing the rate of addition of clarifying chemicals as the level of terbidity of incoming water changes.

Another prior art method is drawn to a method for removing colloidal and/or finely divided insoluble material by adding a floc forming material, for example, alum, to the water in order to form a floc, then adding a filter aid material, then adding a cationic polyelectrolyte; thereafter, the entire suspended matter is removed by simple filtration. The filter utilized is a vaccum or suction filter. The filter aid material is the commercially available filter aid material such as diatomaceous silica, expanded perlite, or other filter aids or mixtures of the same. The cationic polyelectrolytes encompassed by the invention include a hydrophilic alkaline polyamine polyfunctional halohydrin resulting from the condensation of an alkaline polyamine and a polyfunctional halhydrin in aqueous solutions and sold under the trademark NALCO 600. Another example is a branch chain polyelectrolyte containing sulfonium active groups sold under the trademark UCAR C-149.

Therefore, it is an object of this invention to provide a process which overcomes the aforementioned difficulties of the prior art processes and provides an improvement which is a substantial contribution to the advancement of the waste water treatment art.

Another object of the present invention is to provide a process for increasing the efficacy of the primary clarifier thereby decreasing residence time in the primary clarifier also referred to as a sedimentation tank.

Another object of the present invention is to provide a process for increasing the efficacy of the primary clarifier which increases the capacity or flow through rates of a waste treatment plant using a sedimentation tank or primary clarifier.

Another object of the present invention is to provide a process for increasing the efficacy of a primary clarifier by lowering biological oxygen demand and chemical oxygen demand of the influent raw waste water.

Another object of the present invention is to provide a process for increasing the efficacy of a primary clarifier by utilizing a process which does not require a filtration step to increase the efficacy of a primary clarifier.

Another object of the present invention is to provide a process for increasing the efficacy of a primary clarifier by decreasing the concentration of suspended solids of the influent raw waste water.

Another object of the present invention is to provide a process for increasing the efficacy of a primary clarifier by decreasing terbidity by removing colloidal material from the influent raw waste water.

Another object of the present invention is to provide a process for increasing the efficacy of a primary clarifier by reducing the volume of sludge or increasing the density of the sludge collected in the primary clarifier.

The foregoing has outlined some of the more pertinent objects of the present invention. These objects should be construed to be merely illustrative of some of the more prominent features and applicants of the invention. Many other beneficial results can be attained by applying the disclosed invention in a different manner or modifying the invention within the scope of the invention. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into a process for increasing the efficacy of a primary clarifier, also referred to as a sedimentation tank, in raw waste water treatment or clarification by introducing treating materials to the raw waste water upstream of the primary clarifier in a critical order. First, the raw waste water is treated with a sufficient amount of a salt of a water soluble bi- or tri-valent metal selected from the group comprising aluminum, iron and copper, compositions containing the water soluble salt of the bi- or tri-valent metal together with an inert carrier, or a mixture of water soluble salts of the bi- or tri-valent metal, (hereinafter "alum component"), until floccing begins as evidenced by clear patches. Second, the raw waste water containing the alum component is treated with a sufficient amount to fly-ash to increase the dry solids content of the influent raw waste water by about 10-50 percent. Third, the raw waste water containing the alum component and fly-ash is treated with a sufficient amount of cationic surface active polymer composition comprising a water soluble cationic surface active polyether amine polymer to increase the settling rate at the primary clarifier wherein the water soluble cationic surface active polyether amine polymer is provided reacting:

(a) a primary amine having a plurality of primary amino groups; with
(b) a reactant selected from the group consisting of:

(1) an epihalohydrin, an epihalohydrin oligomer, and an epihalohydrin polymer; and
(2) a halohydrin-terminated derivative of a polyol and an epihalohydrin selected from the group comprising: epihalohydrin, an epihalohydrin oligomer and an epihalohydrin polymer to prepare a water soluble, surface active, branched polymeric polyether amine having a cationic charge.

More specifically the invention relates to increasing the efficacy of a primary clarifier in raw waste water clarification by a process which reduces biological oxygen demand and suspended solids by clarifying the influent raw waste water in a primary clarifier by using a water soluble cationic surface active polyether amine polymeric compound comprising the reaction production of:

(a) a primary amine having more than one primary amino moiety such as alkylene polyamines including ethylene diamine, tetramethylene diamine, 1,2 propylene diamine, 1,3 propylene diamine and the like and polyalkylene polyamines such as diethylene triamine, triethyleneamine tetramine, tetraethylene pentamine and the like, including mixture of polyamines; and
(b) a reactant selected from the group consisting of:

1. an epihalohydrin, an epihalohydrin oligomer, and epihalohydrin polymer; and
2. a halohydrin terminated derivative of a polyol and a epihalohydrin selected from the group comprising: epihalohydrin, an epihalohydrin oligomer and an epihalohydrin polymer, to form a cationic branched polyether amine polymer which is useful in the process of the invention. The most preferred reactants are selected from group (a) and (b) 2.

The primary amine containing compounds may be characterized as having an alkylene chain having a plurality of primary amino groups covalently bonded thereto, such as ethylene diamine and optionally with nitrogen atoms of amino groups being substituted for carbon atoms in the alkylene chain which are not connected to another nitrogen, such as diethylene triamine. The amines may be substituted as long as the substituents are not reactive with the chlorine atoms of the oligomer or polymer and/or the polyether.

Mixtures of the above reactions products may also be used, as well as reaction products of the various products, as see U.S. Pat. No. 4,178,434 which is incorporated herein by reference.

Certain commercially available water soluble cationic surface active branched polyether amine polymeric compound containing compositions are available under the trademarks of DELPOLY LJ (POLYMIN PR-841) and POLYMIN SO.

The process for increasing the efficacy of raw waste clarification comprises adding to the influent raw waste water upstream of the primary clarifier in a required sequence:

first, a water soluble salt of a bi- or tri-valent metal selected from the group comprising aluminum, iron or copper, mixtures or compositions thereof, until floccing begins as evidenced by clear patches in the influent stream;

second, fly-ash to increase the dry solids content of the influent raw waste water by about 10-50 percent to the raw waste water upstream from the primary clarifier and downstream from the feed point of the water soluble salt; and third, adding to the raw waste water upstream from the primary clarifier and downstream from the feed point of the fly-ash, the cationic polyether amine polymer to increase the settling rate at the primary clarifier. About 3 to 25 gallons of about a 20-25 percent concentration per million gallons of influent raw waste water is usually sufficient. The sludge forming material is allowed to settle in the primary clarifier thereby reducing the suspended solids and biological oxygen demanding material to produce a clarified effluent from the primary clarifier.

The preferred method to initiate the process for increasing the efficacy of raw waste water clarification in a primary clarifier comprises utilizing the water soluble polyether amine polymer, as described above, and conducting the process for increasing the efficacy of raw waste clarification in the primary clarifier by adding to the raw waste water upstream from the primary clarifier a water soluble salt of a bi- or tri-valent metal selected from the group comprising aluminum, iron or copper, mixtures or compositions thereof, at increasing flow rates until floccing begins as evidenced by clear patches in the influent stream. The water soluble polyether amine polymer is then added at the primary clarifier at increasing flow rates until the water at the top of the primary clarifier is clarified to a depth of about 3 or 4 inches. The flow rates of the water soluble salt and the water soluble polyether amine polymer are then maintained. Fly-ash is then added at a point downstream from the salt feed point and upstream from the polyether amine polymer feed point until the concentration of sludge in the primary clarifier increases while the clarity of the water in the primary clarifier is maintained. If too much fly-ash is added, the water in the primary clarifier will begin to cloud. The sludge forming material is allowed to settle in the primary clarifier and the clarified effluent is recovered.

More specifically, the salt of a water soluble bi- or tri-valent metal is selected from the group comprising aluminum, iron, copper and compositions or mixtures thereof. More particularly, the water soluble salt is selected from the group comprising aluminum sulfate, ferric chloride, ferrous sulfate and aluminum chloride. Also included within the water soluble salts of the invention, are compositions which include one or more of the above metal salts with an inert carrier or mixtures of the above salts.

The preferred water soluble salt comprises aluminum sulfate also referred to as alum. Alum is available commercially as an aqueous solution having a concentration of about 48.5 percent.

The fly-ash of the inventive process is an oxidation product derived from the group comprising coal, waste water, refuse or mixtures thereof. The preferred fly-ash is the oxidation product of coal.

The preferred process for increasing the efficacy of raw waste water clarification by reducing the biological oxygen demand and reducing the amount of suspended solids in a treatment processes utilizing a primary clarifier comprises providing a reaction product of:
(a) a primary amine having a plurality of primary amino groups;
(b) a reactant selected from the group consisting of:
  (1) an epihalohydrin, an epihalohydrin oligomer, and an epihalohydrin polymer; and
  (2) a halohydrin-terminated derivative of a polyol and an epihalohydrin selected from the group comprising: epihalohydrin, an epihalohydrin oligomer and an epihalohydrin polymer to prepare a water soluble, surface active, branched polymeric polyether amine having a cationic charge. The process for increasing the efficacy of raw waste clarification in treatment processes which utilize a primary clarifier comprises adding to the influent raw waste water upstream of the primary clarifier in the following sequence:

first, about 30-180 gallons per million gallons influent raw waste water a 48.5 percent aqueous solution of aluminum sulfate in order to begin floccing;

second, a sufficient amount of fly-ash to increase the dry solids content of the raw waste water by about 10 to 50 percent, whereby the amounts of the salt and the fly-ash being sufficient to increase the available surface area and solids content of the influent raw waste water; and third, about 3 to about 20 gallons of about a 20-25 percent aqueous solution of the polyether amine per million gallons raw waste water at the primary clarifier to increase the settling rate at the primary clarifier;

allowing the sludge forming material to settle in the primary clarifier; and recovering the suspended solids reduced and biological oxygen demanding reduced clarified effluent.

In a more specific embodiment of the invention, the salt of the water soluble bi- or tri-valent metal is selected from a group comprising aluminum, iron, copper. The preferred metal is aluminum. The water soluble salts of the invention comprise aluminum sulfate, aluminum chloride, ferric chloride, ferrous sulfate or mixtures thereof.

The fly-ash component is a product derived from a group comprising coal, sewage or refuse or a mixture thereof and preferably an oxidation product of coal.

The water soluble polyether amine polymeric composition of the process is available under the trademarks DELPOLY LJ, POLYMIN PR-841 or POLYMIN SO.

DELPOLY LJ (also available under the trademark POLYMIN PR-841) is an aqueous solution comprising about a 25% polyether amine polymer (25% active solids) aqueous liquid composition with a pH of 7.0, a specific gravity of 1.08, a pale yellow appearance and a solidification point of $-4°$ C. The viscosity (Brookfield, Cps at 20° C., No. 1 spindle, 12 rpm of 150-500 cps. DELPOLY LJ (POLYMIN PR-841) is freely miscible with cold water. The storage life in months in closed containers at temperatures below 35° C. is six months.

POLYMIN SO is an aqueous solution comprising about a 20% polyether amine polymer (20% active solids) aqueous composition having a pH of 7.8 $-8.7$, a specific gravity of 1.06 with a yellow appearance and a cationic charge. The viscosity (Brookfield at 20° C. and 20/min) is 500-1200 mPa.s. Polymin SO is freely miscible with cold water. The density of Polymin SO is ($d^{20}$) (DIN 51 757) is about 1050 kg/m$^3$. The storage life in closed containers at temperatures below 35° C. is twelve months. POLYMIN SO solidifies at low temperatures, but can be used after thawing.

DELPOLY LJ, POLYMIN PR-841 and POLYMIN SO exhibit a high cationic charge density, probably because of the large number of amino and oxy moieties in the polymer molecule where the oxy moiety intensifies the cationic nature of the amino moiety. This is, however, a theoretical explanation and the inventor does not consider himself bound by it as the only explanation.

The invention provides a process which allows an increase in the flow rate of the primary clarifier and the entire treatment plant while at the same time decreasing: biological oxygen demand (BOD), chemical oxygen demand (COD), suspended solids, colloidal material and volume of sludge from the influent as measured by the effluent from the primary clarifier by the sequential addition of a salt of a water soluble bi- or tri-valent metal selected from a group comprising aluminum, iron, copper and especially aluminum and iron which are available as compounds such as aluminum sulfate, aluminum chloride, ferric chloride, ferrous sulfate or mixtures of the above salt compounds, fly-ash and a polymer composition comprising a polyether amine. The reduction of the above in the primary clarifier reduces the load placed on the plant downstream of the primary clarifier.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts through the several views of the drawings.

DETAILED DESCRIPTION OF THE INVENTION

Figure 1:
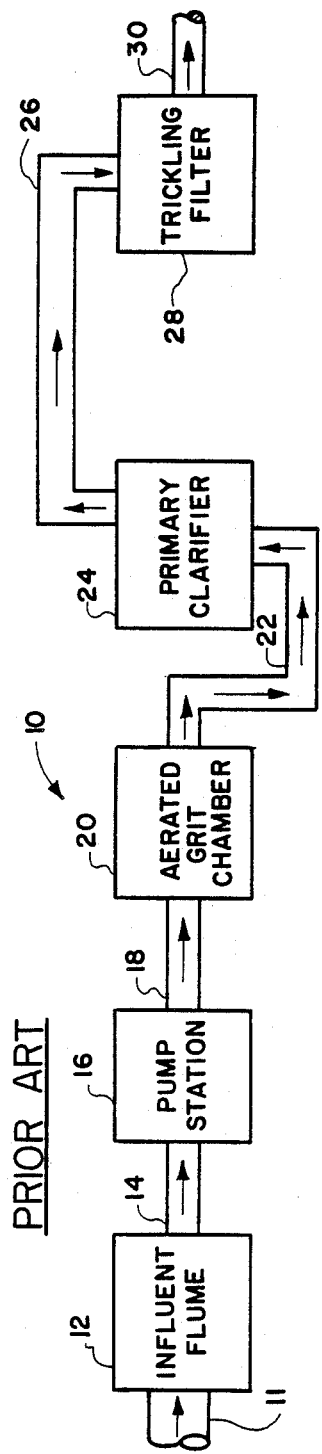
FIG. 1 is a flow diagram of a prior art waste water treatment system.

FIG. 1 illustrates a prior art waste water treatment process 10 wherein waste water from an input line 11 is directed into an influent flume 12, the output of which is directed on a conduit 14 to a pump station 16. The output of pump station 16 is directed on conduit 18 to an aerated grit chamber 20 which aerates the raw waste water and removes grit from the waste water. The output of the aerated grit chamber 20 is directed on a conduit 22 to a primary clarifier 24. The primary clarifier 24 removes solids from the waste water by the sedimentation process with the output of the primary clarifier 24 being removed from the upper surface of the primary clarifier 24 by a conduit 26 to a trickling filter 28. The output of trickling filter 28 is directed through a conduit 30 to subsequent treatment processes which should be well known to those skilled in the art.

Figure 2:
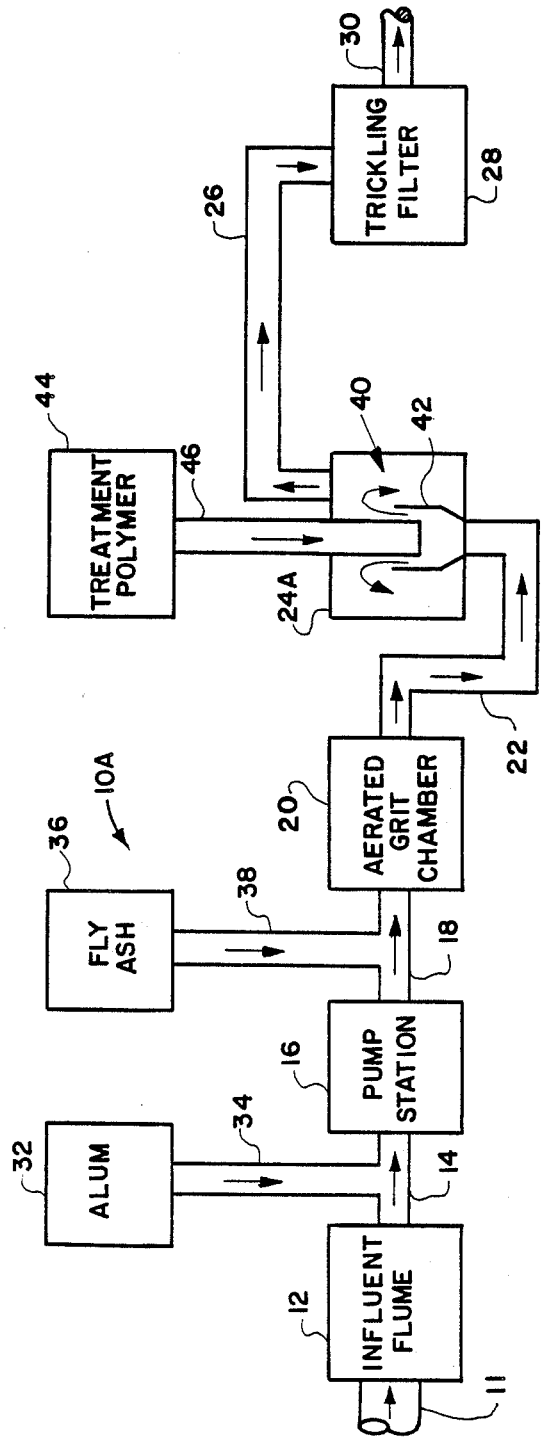
FIG. 2 is a flow diagram of the improved waste water treatment process.

FIG. 2 illustrates the new waste water treatment 10A process with similar parts being labeled with similar reference characters as a prior art process shown in FIG. 1. In this process, the output of the influent flume 12 is mixed with alum from a alum component source 32 by conduit 34. The alum component may be mixed with the raw waste water at any convenient place in the process 10A where sufficient mixing of the raw waste water and alum will occur and may not be necessarily be located between the influent flume 12 and pump station 16.

The output of pump station 16 is mixed with fly-ash from a fly-ash source 36 through conduit 38, the combination of which is passed through the aerated grit chamber 20. The output of the aerated grit chamber 20 on conduit 22 is passed through a mixer generally designated 40 in a modified primary clarifier 24A wherein a conduit 42 containing the waste water is mixed with a treatment polymer for treatment polymer source 44 entering through conduit 46. Preferably the mixer 40 enables mixing of the treatment polymer with the waste water entering the primary clarifier 24A. The output of the primary clarifier 24A is directed along conduit 26 to the trickling filter 28 as heretofore described.

Although the introduction of alum, fly-ash and treatment polymer have been shown in FIG. 2 to be located at particular stages of the treatment process, numerous variations in the location of the introduction of these materials may be incorporated within the process which will provide satisfactory results as long as the sequential addition set forth herein is maintained.

The unexpected results of the process shown in FIG. 2 are accomplished by the discovery that the sequential addition of: (1) a salt of a water-soluble bi- or tri-valent metal or mixtures thereof, is first added to the influent raw waste water upstream of the primary clarifier (2) fly-ash is added upstream of the primary clarifier yet downstream of the water-soluble metal salt(s) and (3) adding a cationic surface active polymer compositions comprising a water soluble cationic polyether amine polymeric compound or the polyether amine compound containing composition at the primary clarifier.

More particularly, the unexpected superior results of increasing the efficacy of the primary clarifier is accomplished by the discovery that the sequential addition of: first, ading to the raw waste water about a 45% aqueous solution of alum upstream of the primary clarifier in an amount sufficient to begin floccing. Generally, about 30–180 gallons per million gallons influent raw waste water (about 20 to about 120 ppm (wt.)) of 45% aqueous solution of alum is used. Second, adding dry fly-ash in an amount to increase the dry solids content of the influent raw waste water by about 10–50 percent, upstream of the primary clarifier but downstream of the alum feed point. Third, adding DELPOLY LJ (POLYMIN PR-841) or POLYMIN SO at a rate sufficient to clarify the water at the top of the primary clarifier to a depth of about 3 or 4 inches. Generally, about 3–20 gallons per million gallons influent raw waste water at the primary clarifier is sufficient.

The process of the invention is initiated by adding an amount of alum component to the waste water sufficient to bring about floccing in the influent stream. The polyether amine polymer is then added until the water at the top of the primary clarifier is clarified to a depth of about 3 or 4 inches. The fly-ash component is then added until the until the concentration of sludge increases while maintaining the clarity of the water in the primary clarifier. An increase in terbidity, indicates that too much fly-ash has been added.

The preferred manner of initiating the process is to add about 15 parts by volume of about a 50% aqueous solution of a salt of a water soluble bi- or tri- valent metal compound or mixtures thereof upstream of the primary clarifier to about a 1 part by volume of about a 25% aqueous solution of a polyether amine added upstream of the primary clarifier but downstream from the salt feed point (15 parts salt to 1 part polymer). This ratio is maintained until the water at the top of the primary clarifier clarifies to a depth of about 3 or 4 inches, indicating a state of equilibrium has been established. Fly-ash is then added at a point downstream from the salt feed point and upstream from the polyether amine polymer feedpoint until the concentration of sludge increases while the clarity of the water in the primary clarifier is maintained, indicating that a state of equilibrium has been attained in the three component system. The 15 to 1 ratio results in a low volume and high concentration sludge, with excellent water clarity and BOD removal. However, within the 15 to 1 ratio, there must be enough, but not too much, of the alum component and polyether amine polymer. For example and by way of illustration, at 120 gallons to 8 gallons may be too low for good water clarity; whereas, at 135 gallons to 9 gallons results in a good low sludge volume, water clarity and excellent BOD removal; and at 150 gallons to 10 gallons results in the desired sludge volume and concentration with excellent water quality and BOD removal; and, at 165 gallons to 11 gallons the same results as at 150 to 10 may be obtained. However, at 180 gallons to 12 gallons excellent water quality is obtained but the sludge volume increases.

One the above state of equlibrium has been attained, the feed of polyether amine polymer may be reduced by about 10% without reducing the advantages of the process. Once the polyether amine has been reduced the process should be closely monitored as the tolerance of the process to varying waste water components and concentrations may be lessened.

It is believed that the water soluble metal salt or alum component and the fly-ash component increase the available surface area and solids content of the raw waste water which when combined with the polyether amine composition, DELPOLY LJ (POLYMIN PR-841), results in a system with varying degrees of charge potentials. This results in an increase in particle weight and mass which further results in a rapid settling sludge. The results are much better when either DELPOLY LJ (POLYMIN PR-841) or POLYMIN SO is used because of its unique ability to shear and refloc which allows for the accumulation of more and more colloidal and other particles after the shear force is withdrawn. Moreover, metal ions are removed to an extent, by complexing in the system. This is, however, a theoretical explanation and the inventor does not consider himself bound by it as the only explanation.

The cationic surface active polymer composition can be selected from any water soluble liquid polymer composition which comprises a polyether amine such as prepared according to a process described in U.S. Pat. No. 4,178,434 which is incorporated herein by reference. Certain polyether amines useful in the process of the invention are known, as see U.S. Pat. No. 3,408,293, (especially col. 6-7) which is incorporated herein by reference. The prior art fails to teach or suggest the criticality of the components and their sequential introduction into the raw waste water stream in primary clarifier clarification. A primary clarifier is approximately 40 to 60 percent efficient in removing suspended solids. The same clarifier under similar conditions removes about 80 to 90%, and more particularly at least 80 to 90% of the suspended solids from the raw waste water influent when utilizing the process of the invention. At this efficiency, 80 to 90%, the need for further treatment, other than perhaps chlorination, may not be required to meet present Federal EPA requirements of 30/30. The sequential process of the invention alone, without chlorination, is usually sufficient to meet Federal EPS requirements. To prepare the polyether amine for use in the inventive process comprises reacting a primary amine having more than one primary amino moiety per molecule with a reactant selected from the group consisting of: (1) epihalohydrin, an epihalohydrin oligomer, or an epihalohydrin polymer; and (2) a halohydrin terminated derivative of a polyol and an epihalohydrin selected from the group comprising: epihalohydrin, an epihalohydrin oligomer and an epihalohydrin polymer or a mixture of the above end products. The water soluble polymeric polyether amine composition of the invention is sold under the trademarks POLYMIN SO 20% aqueous solution, or DELPOLY LJ (DELLCHEM) (POLYMIN PR-841 (BASF) as about a 25% solution which are readily soluble in cold water. DELPOLY LJ (POLYMIN PR-841) and POLYMIN SO are readily available from: BASF Corporation, 100 Cherry Hill Rd., Parsippany, N.J. 07054; Thompson-Hayward Chemical Company, 5132 Trenton St., Tampa, Fla. or the home office at: 5200 Speaker Rd., Kansas City, Kans. 66106 and Dellchem Chemical Company, P.O. Box 1963, New Port Richey, Fla. 33552. POLYMIN SO, DELPOLY LJ (POLYMIN PR-841) are all manufactured by BASF.

Any water soluble metal such as aluminum sulfate, potassium-aluminum sulfate, ammonium-aluminum sulfate, copper sulfate, ferric chloride, ferric sulfate or ferrous sulfate is contemplated by the invention. This component is best added to the raw waste water as an aqueous solution in order to aid in a proper or complete mixing. The standard readily available commercial product of aluminum sulfate is a 48.5% aqueous solution. Alum is readily available from Allied Chemical, Industrial Chemicals Division, P.O. Box 1139R, Morristown, N.J. 07960, and among other suppliers known in the art.

The fly-ash component can be the oxidation product of coal, waste water, refuse or any like composition. The composition of coal fly-ash comprises titanium, magnesium, sodium, sulfur, iron, silicon, calcium, potassium, phosphorous and aluminum as the oxides. The exact oxidation composition would be expected to vary based on the type of coal and location mined. The oxidation composition would also vary between the source utilized, that is, coal, sewage, refuse or the like. This component can be added to the raw waste water in any form, e.g., slurry, dry powder, etc. as necessary to insure good mixing.

The following analysis is for coal fly-ash: (the elements are present as oxides)

The following analysis is for sewage fly-ash: (the elements are present as oxides)

| Ti | | 1.137% | Ti | | 0.950% |
|---|---|---|---|---|---|
| Mg | | 0.766% | Mg | | 0.669% |
| Na | | 0.400% | Na | | 0.479% |
| S | | 1.442% | S | | 0.715% |
| Fe | | 41.585% | Fe | | 48.505% |
| Si | | 33.612% | Si | | 29.824% |
| Ca | | 3.509% | Ca | | 2.935% |
| K | | 1.008% | K | | 1.026% |
| P | | 0.174% | P | | 0.412% |
| Al | | 21.037% | Al | | 16.631% |
| Sum | = | 104.669 | Sum | = | 102.145 |

-continued

| Silica Value | = | 42.2948 | Silica Value | = | 39.4009 |
|---|---|---|---|---|---|
| Ti | | 0.958% | | | |
| Mg | | 0.676% | | | |
| Na | | 0.315% | | | |
| S | | 0.840% | | | |
| Fe | | 49.753% | | | |
| Si | | 28.811% | | | |
| Ca | | 2.594% | | | |
| K | | 1.019% | | | |
| P | | 0.329% | | | |
| Al | | 16.487% | | | |
| Sum | = | 101.781 | | | |
| Silica Value | = | 35.2067 | | | |

The following analysis is for sewage fly-ash: (the elements are present as oxides)

| Ti | 0.737% | Ti | | 0.713% |
|---|---|---|---|---|
| Mg | 2.187% | Mg | | 2.111% |
| Na | 1.232% | Na | | 1.112% |
| K | 0.675% | K | | 0.652% |
| P | 14.827% | P | | 14.693% |
| Al | 12.47% | Al | | 13.375% |
| Sum | = 92.3683 | Sum | = | 99.9325 |
| Silica Value | = 55.7655 | Silica Value | = | 62.9804 |

The physical characteristic of coal fly-ash are noted in the following table:

| TAMPA ELECTRIC COMPANY FLY ASH QUALITY | | | | | |
|---|---|---|---|---|---|
| GANNON | | | | | |
| | Spec. | Min. | Avg. | Max. | Std. Dev. |
| Mean Particle Diameter (micron) | — | 4.06 | 7.18 | 9.9 | 0.93 |
| Specific Surface Areas (cm²/g) Blaine Fineness ASTM C-204 | — | 2514 | 3352 | 5689 | 585 |
| 325 Mesh Reside (%) C-618 | 34 | 6.45 | 19.09 | 29.81 | 4.49 |
| Loss on Ignition (%) ASTM C-618 | 12 | 1.74 | 5.45 | 13.01 | 2.24 |
| Specific Gravity (g/cm³) | — | 2.33 | 2.48 | 2.65 | 0.026 |
| BIG BEND | | | | | |
| | Spec. | Min. | Avg. | Max. | Std. Dev. |
| Mean Particle Diameter (micron) | — | 5.57 | 7.59 | 9.7 | 0.86 |
| Specific Surface Areas (cm²/g) Blaine Fineness ASTM C-204 | — | 2361 | 3146 | 4224 | 419 |
| 325 Mesh Reside (%) C-618 | 34 | 11.21 | 19.54 | 26.14 | 3.77 |
| Loss on Ignition (%) ASTM C-618 | 12 | 1.20 | 3.29 | 6.82 | 1.14 |
| Specific Gravity (g/cm³) | — | 2.38 | 2.55 | 2.70 | 0.073 |

The fly-ash can be visualized as many small spheres of "glass-like" particles with the quality fine enough to be called dust. While neither the amount of any particular element of fly-ash nor any particular element of fly-ash is considered critical in the inventive process, a mixture of oxides which substantially falls within the qualitative fingerprint of the oxidized product of coal, sewage, garbage or the like would be within the inventive concept.

The amount of fly-ash or the like can easily be determined by one skilled in the art by considering the dry solids content of the influent raw waste water.

It must be emphasized that each component or ingredient must be added in the particular sequential order and furthermore each component should be added in such a way as to insure a complete mixing with the raw waste water. If the sequence is not followed, the process will not yield all the advantages. If the fly-ash is deleted, then the capacity of the primary clarifier is only increased at most about 25 to 50 percent and a higher sludge volume. The sequence absent the fly-ash may be utilized where secondary treatment such as a trickling filter, activated sludge system, rotating bio-disk, or the RBC system is used. In order to meet EPA requirements when the fly-ash component of the sequential process is absent secondary treatment of the effluent of the primary clarifier is required. However, in the alum component-fly ash-polyether amine sequence, the hydraulic and/or biologic loading or capacity of the primary clarifier may be increased much more than 50% while maintaining the advantages of the process of the invention including meeting EPA requirements without further treatment of the effluent from the primary clarifier, except for perhaps, chlorination.

The composition of waste water includes a myriad of waste elements which require oxygen (BOD and COD) such as: meat processing plants, pulp and paper mills, cleaning and washing facilities, chemical plants, animal waste products, oil refining plants, citrus plants, food processing plants. Generally, the greater the amount of the COD and BOD demanding particles that can be removed as sludge, the greater the economic savings in treating waste water.

To establish the efficacy of the invention the following test was conducted at the city of Lakeland, Fla. waste water treatment facilities. A ten day test using the inventive process to treat approximately 6,000,000 gallons per day (gpd) in a plant designed for 4,000,000 gpd (50% over design) was undertaken. The plant utilizes a primary clarifier, a tricking filter and a secondary clarifier before discharging into a pond. The primary clarifier is about 40-50 percent efficient in removing suspended solids without the process of the invention. BOD5 (5 day incubation) and TSS (total suspended solids) tests were run daily on composite samples by the city's lab. The city's lab results are considered reliable in view of a recent inspection of sampling and testing procedures performed by FDER at the city's request. The State of Florida EPA limits are 20/20, i.e., neither the BOD nor the TSS can be greater than 20 per a 30 day average of each. The less strict Federal EPA limts are 30/30.

| LOADING ONE SIDE OF PLANT, USING DELLCHEM PROCESS | | | | | |
|---|---|---|---|---|---|
| BOD5 | | TSS | | | TOTAL |
| Raw | Final Plant Discharge | Raw | Plant Final Discharge | FLOW, WEST CLARIFIER (MGD) | FLOW (MGD) (entire plant) |
| 200 | 6 | 119 | 11 | 6.12 | 8.50 |
| 180 | 11 | 119 | 15 | 6.56 | 9.12 |
| 185 | 18 | 115 | 11 | 6.27 | 8.72 |
| 320 | 9 | 176 | 11 | 6.19 | 8.61 |
| 290 | 14 | 190 | 10 | 6.60 | 8.81 |
| 120 | 8 | 181 | 14 | 5.59 | 7.70 |
| 180 | 8 | 137 | 16 | 6.50 | 9.04 |
| 170 | 8 | 119 | 12 | 6.34 | 8.82 |
| 290 | 14 | 170 | 9 | 6.30 | 8.76 |
| 320 | 10 | 149 | 9 | 6.14 | 8.54 |
| AVG. 225 | 11.5 | 147 | 11.8 | 6.26 | 8.67 |

| RESULTS OF 5 DAY DEMONSTRATION, LOADING ONE SIDE OF PLANT, WITHOUT USING DELLCHEM PROCESS | | | |
|---|---|---|---|
| BOD5 | | TSS | |
| RAW | Final Plant Discharge | RAW | Final Plant Discharge |
| 140 | 24 | 116 | 21 |
| 160 | 37 | 128 | 27 |
| 260 | 55 | 173 | 43 |
| 260 | 51 | 178 | 32 |
| 270 | 56 | 196 | 35 |
| AVG. 218 | 44.6 | 158.2 | 31.6 |

The figures reflected in the lab tests indicate consistent results in satisfactory reduction in BOD5 and TSS during the 10 day demonstration period using the process. BOD5 reduction averaged 95.0% and TSS averaged 92.0%. During the subsequent 5 day period when the process was not used, lab tests indicated consistently unsatisfactory results in reduction of BOD5 and TSS. Without the process BOD5 reduction averaged 79.6% and TSS reduction averaged 80.0%.

As further evidence of the inventive sequence to decrease suspended solids and to lower BOD the following test was conducted: (Lakeland)

```
                        S/S - 244
        After treatment*, at primary clarifier
                        BOD - 45
                        S/S - 69
                        % Removal
                        BOD - 80.5
                        S/S - 72.5
```
*Sequential treatment in accordance with the invention:
First: Alum: (48.5% aqueous solution) 86 ppm
Second: Fly-ash: 200 lbs./million gallons influent
Third: DELPOLY LJ: 5 ppm (wt.)

It is interesting to note that at the trickling filter, the BOD and suspended solids increased. This is thought to be due to the bacteria matter that is present in the trickling filter which was dying off as a result of the low BOD and suspended solids from which they drive their food source.

The volume of sludge produced by this process is less than the volume of sludge produced normally, notwithstanding the addition of alum, fly-ash and polymer to the system. That is, the resultant sludge in the inventive process is a denser product.

It has been further discovered that the alum component in the inventive process may be substituted entirely by a water soluble aluminum composition sold under the trademark ULTRION-7109 (Nalco Chemical Co., 2901 Butterfield Rd., Oak Brook, Ill. 60521). It is believed that ULTRION-7109 includes at least one water soluble aluminum salt, aluminum chloride.

The alum component can be substituted to a certain extent by increasing the amount of fly-ash. However, in no instance may the fly-ash be completely replaced by the alum component. Alum added at higher rates will result in an increased settling rate if a correspondingly larger amount of polymer and fly-ash are also added. Accordingly, the determination of the optimum dosage levels of each component within the sequence can easily be determined by one of ordinary skill in the art. In other words the amounts may be varied as dictated by economical and/or environmental conditions. Moreover, the sequence may, if considered environmentally necessary, be repeated.

In order to illustrate the use of ULTRION-7109 (a water soluble salt composition comprising aluminum) as an alum component, a jar-test was conducted:

| Raw Sewage: | BOD - 140 |
|---|---|
| | S/S - 178 |
| Treated*: | BOD - 8 |
| | S/S - 11 |
| % Removal: | BOD - 94 |
| | S/S - 93.7 |

*Sequential treatment in accordance with the invention:
First: Ultrion 7109     30 ppm
Second: Fly-ash         200#/million gallons influent
Third: DELPOLY LJ       5 ppm The use of the polyether amine polymer composition of the invention permits sheer induced destruction of the floc structure to reversibly refloc when the impact of sheer is discontinued.

The following tests were conducted at the Lakeland Municipal Waste Water Treatment Plant. This is a ten million gallon a day plant, which is a medium size plant and if this process does work in a medium size plant, such as Lakeland facilities, we feel it would work on a larger or smaller plant as well.

The plant was overloaded one hundred percent average biologically, which gives us the most extreme condition to work with.

At least three major industrial plants discharge to these facilities.

Procedure:

This started at 7:30 a.m. with the average climate. The following is the results of these tests and a sequence which material was added. All samples were kept cool and received by the laboratory at 2:30 p.m. in the same afternoon and the tests were conducted according to EPA's Manual. (EPA-600-4179-020).

| Test No. | Sequence 1st/2nd/3rd | pH | NTU | S/S | COD | BOD | % BOD Removal | % S/S Removal |
|---|---|---|---|---|---|---|---|---|
| 1st | Raw at start | 6.3 | 67 | 290 | 610 | 570 | | |
| 2nd | AL/FA/LJ | 6.1 | 10.0 | 28 | 150 | 29 | 94.6 | 97.8 |
| 3rd | LJ/AL/FA | 6.2 | 53 | 224 | 380 | 325 | 39.8 | 39.4 |
| 4th | LJ/FA/AL | 6.0 | 53 | 120 | 350 | 325 | 39.8 | 67.5 |
| 5th | FA/AL/LJ | 6.1 | 52 | 155 | 550 | 315 | 41.6 | 58.1 |
| 6th | FA/LJ/AL | 6.0 | 55 | 160 | 370 | 345 | 36.1 | 56.7 |
| 7th | All same time | 6.1 | 57 | 135 | 400 | 390 | 27.7 | 63.5 |
| 8th | AL/FA/LJ | 6.1 | 10.1 | 20 | 150 | 30 | 94.4 | 94.5 |
| 9th | Raw at finish | 6.3 | 60 | 370 | 550 | 540 | | |

Alum (AL) 135 Gallons per one million gallons of influent.
Fly-ash-Untreated(FA) 50 ppm.
DelPoly LJ (LJ) 8 Gallons per one million gallons of influent.

The percent BOD and percent S/S removal results are based on the raw at finish.

Conclusion:

According to above analysis, the change of sequence of Alum Fly-ash and DelPoly LJ has an affect on percent removal of Biological Oxygen Demand (B.O.D.), Suspended Solids (S/S), COD and Terbidity without a great change of the pH. It is only fair to note that all conditions were kept exactly the same. Also, tests were conducted at the site to reduce any changes that might cause in transportation of the raw sample to the laboratory.

Observation:

Without extensive testing, it is difficult to state the exact cause of this phenomenon. However, the theory is Alum starts the process of separating then fly-ash is added, it apparently helps the molecules to settle with the aid of DelPoly LJ which pulls them together.

The best mode embraces the sequential addition of: upstream of the primary clarifier—first, a 48.5% aqueous solution of aluminum sulfate (alum at a rate of about 30 to about 180 gallons per million gallons influent raw waste water; second, dry fly-ash (derived from coal) added to increase the dry solids content of the influent raw waste water by about 10% to about 50%; and third, adding DELPOLY LJ (POLYMIN PR-841) at a rate of about 3 to about 20 gallons per million gallons raw waste water at the primary clarifier.

It will apparent to those skilled in the art that numerous changes and modifications may be made in the instant process without departing from the scope thereof.

What is claimed is:

1. A method of initiating a process for increasing the efficacy of a primary clarifier by removing about 80 to 90%, or more, of the suspended solids present in the raw waste water effluent and reducing the biological oxygen demand to below about 30 ml/l comprising:

adding to the raw waste water upstream from the primary clarifier a sufficient amount of a water soluble salt of bi- or tri-valent metal selected from the group consisting of: aluminum, iron or copper, mixtures or compositions thereof, until floccing begins;

adding a sufficient amount of a water soluble cationic, surface active polymeric polyether amine compound comprising the reaction product of (a) of a primary amine containing compound having a plurality of primary amino groups selected from the group consisting of: ethylene diamine, tetramethylene diamine, 1, 2 propylene diamine, 1, 3 propylene diamine, diethylene triamine, triethyleneamine tetramine, and tetraethylene pentamine or mixtures thereof; and (b) a reactant selected from the group consisting of:

(1) an epihalohydrin, an epihalohydrin oligomer, and an epihalohydrin polymer; and (2) a halohydrin-terminated derivative of a polyol and an epihalohydrin selected from the group consisting of: epihalohydrin, an epihalohydrin oligomer and an epihalohydrin polymer, to prepare a water soluble, surface active, branched, polymeric polyether amine having a cationic charge;

to increase the sludge forming material settling rate at the primary clarifier until the water at the top of the primary clarifier is clarified to a depth of about 3 or 4 inches;

adding a sufficient amount of fly-ash to increase the dry solids content of the waste water by about 10–50% at a point downstream from the salt feed point and upstream from the amine feed point until the concentration of sludge increases while the clarity of the water in the primary clarifier is maintained;

allowing the sludge forming material to settle in the primary clarifier; and recovering the reduced suspended solid and reduced biological oxygen demanding clarified waste water effluent from the primary clarifier.

2. The process of claim 1 wherein the salt is about a 50% aqueous solution and the polyether amine are added at a ratio of 15:1 by volume 3. The process of claim 1 wherein the cationic, water soluble, surface active, branched polymeric polyether amine compound is added at a rate of about 3 to 25 gallons of about a 20–25 percent concentration per million gallons of influent raw waste water.

4. The process of claim 1 wherein the salt of a water soluble tri-valent metal is selected from the group consisting of aluminum and iron, compositions or mixtures thereof.

5. The process of claim 4, wherein the water soluble salt comprises aluminum sulfate, aluminum chloride, ferric chloride, ferrous sulfate, compositions or mixtures thereof.

6. The process of claim 5, wherein the water soluble salt is aluminum sulfate.

7. The process of claim 6, wherein the water soluble salt comprises about a 48.5% aqueous solution of aluminum sulfate.

8. The process of claim 1, wherein the fly-ash is the oxidation product derived from the group consisting of coal, waste water, refuse or mixtures thereof.

9. The process of claim 8, wherein the fly-ash is the oxidation product of coal.

10. The method of claims 1 wherein the cationic, surface active polymeric polyether amine comprises a cationic, water soluble, surface active, branched polymeric polyether amine compound being provided in a composition of an aqueous solution comprising about a 25% cationic surface active polyether amine polymer (about 25% active solids) aqueous liquid composition with a pH of 7.0, a specific gravity of 1.08, a pale yellow appearance, a solidification point of −4° C., a viscosity (Brookfield, Cps at 20° C., No. 1 spindle, 12 rpm) of 150–500 cps and being freely miscible with cold water.

11. The method of claims 1 wherein the cationic, surface active polymeric polyether amine comprises a cationic, water soluble, surface active, branched polymeric polyether amine compound being provided in a composition of an aqueous solution comprising about a 20% cationic surface active polyether amine polymer (about 20% active solids) aqueous composition having a pH of 7.8–8.7, a specific gravity of 1.06 with a yellow appearance, a viscosity (Brookfield at 20° and 20/min) of 500–1200 mPa.s, freely miscible with cold water and a density of (d 20) (DIN 51 757) approximately 1050 kg/m$^3$.

* * * * *